(12) United States Patent
Toffolo et al.

(10) Patent No.: US 6,337,675 B1
(45) Date of Patent: ***Jan. 8, 2002

(54) DISPLAY SYSTEM WITH AUTOMATIC AND MANUAL BRIGHTNESS CONTROL

(75) Inventors: Daniel Toffolo, Dearborn; Silviu Palalau, Birmingham, both of MI (US)

(73) Assignee: UT Automotive Dearborn, INC, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,365

(22) Filed: Oct. 30, 1997

(51) Int. Cl.[7] ................................................. G09G 3/30
(52) U.S. Cl. ......................... 345/77; 345/207; 348/227; 348/229
(58) Field of Search ............................ 345/77, 76, 207; 315/157, 150, 158, 159; 348/227, 228, 229

(56) References Cited

U.S. PATENT DOCUMENTS

| | | | |
|---|---|---|---|
| 5,453,939 A | * | 9/1995 | Hoffman et al. ....... 364/551.01 |
| 5,554,912 A | | 9/1996 | Thayer et al. ............... 315/157 |
| 5,583,484 A | | 12/1996 | Asano ......................... 340/461 |
| 5,666,028 A | * | 9/1997 | Bechtel et al. ................. 315/82 |

FOREIGN PATENT DOCUMENTS

| | | |
|---|---|---|
| DE | 3042586 | 6/1982 |
| DE | 4409777 | 9/1995 |
| JP | 58224821 | 12/1983 |

* cited by examiner

*Primary Examiner*—Bipin Shalwala
*Assistant Examiner*—Jimmy H. Nguyen
(74) *Attorney, Agent, or Firm*—Timothy J. Haller; Niro, Scavone, Haller & Niro

(57) ABSTRACT

A display system provides automatic and manual brightness control. A brightness controller varies the luminance of the display based upon ambient light as sensed by an ambient light sensor. The brightness control varies the luminance of the display between the minimum luminance at a minimum illuminance to a maximum luminance at a maximum illuminance. Preferably, a user input device selectively varies the maximum illuminance at which the display displays said maximum luminance and selectively alters the minimum luminance which is displayed at the minimum illuminance.

12 Claims, 1 Drawing Sheet

DISPLAY SYSTEM WITH AUTOMATIC AND MANUAL BRIGHTNESS CONTROL

BACKGROUND OF THE INVENTION

The present invention relates generally to displays and more particularly to a display having automatic brightness control which is particularly useful for a vehicle display.

Current vehicles are increasingly including high resolution, re-configurable displays, such as electroluminescent displays. One known difficulty in utilizing such displays in vehicles is that the display may be difficult to see during the day in bright sunlight. In order to compensate for the problem, the brightness of the display may be increased manually. However, if the brightness of the display is increased, it will be too bright at night and interfere with the vision of the driver.

SUMMARY OF THE INVENTION

The present invention provides a display system having automatic and manual brightness control. A brightness controller varies the brightness ("luminance") of the display based upon the ambient light ("illuminance"), as sensed by an ambient light sensor. The brightness controller varies the luminance of the display between a minimum luminance at a minimum ambient light level (minimum illuminance) to a maximum luminance at a maximum ambient light level (maximum illuminance). The display displays the maximum luminance when the ambient light sensor senses ambient light greater than or equal to the maximum illuminance. The display displays the minimum luminance when the ambient light sensor senses less than or equal to the minimum illuminance.

Preferably, the display system includes a user input device. The user input device selectively alters the maximum illuminance at which the maximum luminance is displayed. Further, the user input device selectively varies the minimum luminance displayed by the display at the minimum illuminance.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
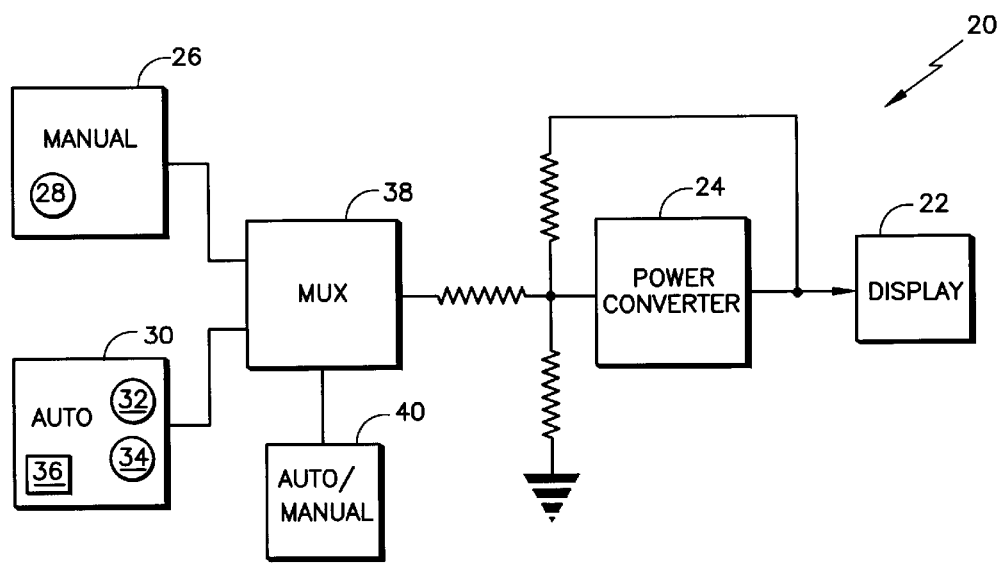
FIG. 1 is a schematic of the display system of the present invention.

The present invention provides a display system 20 for manually and automatically controlling the brightness or "luminance" of a display 22. As shown in FIG. 1, the luminance of the display 22 can be controlled by varying the voltage from a power converter 24. There are numerous other techniques varying the luminance of the display 22, such as varying refresh rates.

A manual input circuit 26 includes a user activated input device 28, such as a switch or rotary knob. An automatic input circuit 30 includes a first user input device 32 and a second user input device 34, which will be described in more detail below. The automatic input circuit 30 further includes a photo sensor 36 for sensing the level of ambient light, or "illuminance", near the display 22. For a display 22 installed in a vehicle, the photo sensor 36 would measure the illuminance in and/or around the vehicle. A multiplexer 38 selectively chooses the input from either the manual input circuit 26 or the automatic input circuit 30 as determined by a switch 40. Alternatively, the multiplexer 38 always selects the manual input circuit 26 whenever a change is detected in the manual input circuit 26 level, such that the manual input circuit 26 overrides the automatic input circuit 30 when the manual input circuit 26 is changed.

Figure 2:
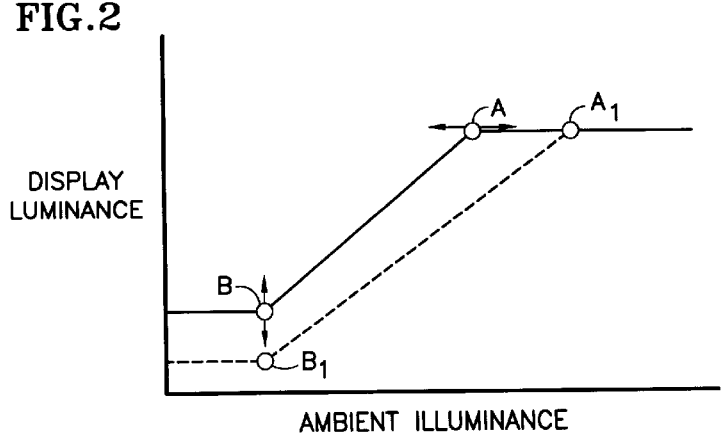
FIG. 2 is a graph showing the operation of the display system of FIG. 1.

FIG. 2 is a graph illustrating the preferred relationship between the luminance of the display 22 and the illuminance as sensed by the photosensor 36. As can be seen in FIG. 2, the display luminance of the display 22 increases with illuminance between points A and B. At point A, the display 22 is preferably displaying its maximum luminance, i.e. the luminance at point A is a physical limitation of the display 22. At point B, the photosensor 36 is preferably measuring ambient light at or near its threshold level, i.e. the photosensor 36 cannot distinguish ambient light levels below that of point B. Between points A and B, the luminance of the display 22 increases with the illuminance as measured by the photosensor 36. Although shown linearly in FIG. 2, any rate or shape of the increase between points A and B could be utilized, such as logarithmic, exponential, linear, etc.

Preferably, point A on the graph is selectively variable along the illuminance axis by a user with the first user input device 32 (FIG. 1). In this manner, the user can adjust the illuminance at which the display 22 displays its maximum luminance. Any illuminance sensed by the photosensor 36 to be at or above the illuminance level at point A would cause the display system 20 to display the display 22 at its maximum luminance.

The second user input device 34 selectively varies the luminance of the display 22 which is displayed at the minimum illuminance detectable by the photosensor 36. The user input device 34 selectively varies the luminance of the display 22 at the lowest level of illuminance distinguishable by the photosensor 36. As can be seen in FIG. 2, when points A and B are selectively varied, for example, to points $A_1$ and $B_1$, the function of the display luminance and illuminance between points $A_1$ and $B_1$, are altered accordingly, such that the luminance of the display 22 is a continuous function.

In operation, a user selectively alters points A and B utilizing user input devices 32 and 34, respectively. When the photosensor 36 detects that the level of ambient light is below point B, the display 22 is displayed at a minimum luminance level, which is selected by the second user input device 34. When the photosensor 36 detects that the ambient light level is at or above that indicated at point A, as selected by user input device 32, the display 22 is displayed at a maximum luminance level, which is preferably the maximum luminance level that can be displayed by the display 22. When the photosensor 36 detects that ambient light level is between points A and B, the display 22 is displayed as a function of the illuminance between the light levels indicated at points A and B.

Figure 3:
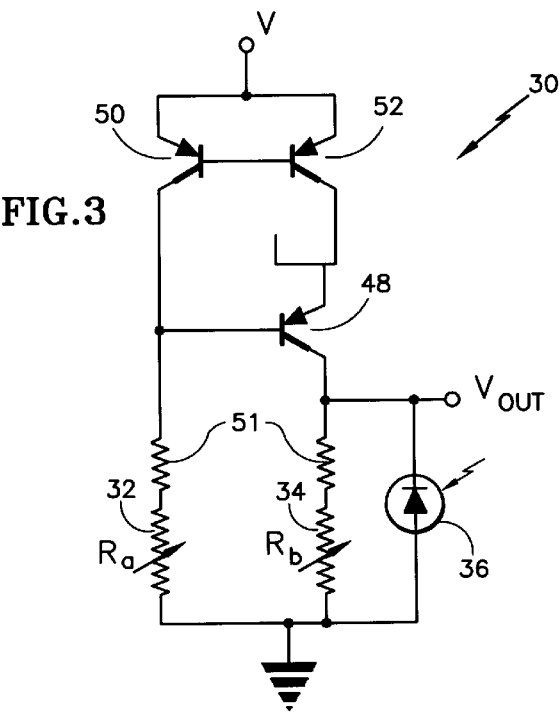
FIG. 3 is one possible embodiment for the automatic input circuit of FIG. 1.

One possible schematic for implementing the automatic input circuit 30 of FIG. 1 is shown in FIG. 3. In this case, the first and second user input devices 32, 34 are variable resistors $R_a$ and $R_b$, respectively. Resistor $R_b$ is connected in parallel with the photosensor 36 and between an collector of a first transistor 48 and ground. A resistor $R_a$ is connected to the base of the first transistor 48 and the collector of a second transistor 50 at one end and ground at the other. Fixed resistors 51 are connected adjacent the variable resistors $R_a$, $R_b$ to prevent a zero resistance condition. A third transistor 52 connects the first and second transistors, as shown.

Although the schematic of FIG. 3 illustrates one embodiment for implementing the automatic input circuit 30, it should be recognized that there are numerous circuits which could be used to implement the automatic input circuit 30 of FIG. 1. Those reasonably skilled in the art would recognize that the manual input circuit 26, automatic input circuit 30 and multiplexer 38 could all be implemented entirely in software operated by a microprocessor circuit. As an alternative, or in addition, those reasonably skilled in the art would be aware of many circuits for conditioning and shaping the signal generated by the photosensor 36. For example, the signal from the photosensor 36 could be converted to digital form and processed in software, such as with a lookup table.

The display system 20 of the present invention provides automatic and manual brightness control. The display system 20 provides immediate manual control with user input device 28. Further, the display system 20 permits user customization of the maximum illuminance at which the display 22 is displayed at its brightest and the luminance of the display which is displayed when the photosensor 36 detects a minimum illuminance.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A display system comprising:

a display for displaying information at a luminance;

an ambient light sensor for generating a signal indicating ambient illuminance; and a display controller for receiving said signal from said ambient light sensor, wherein each luminance at which said display displays the information is representable on a graph as a function of a corresponding illuminance and said display controller automatically varies said luminance of said display between a maximum luminance and a minimum luminance based upon said signal from said light sensor in accordance with the graph, wherein said display controller includes a first user input device for manually adjusting a first point on the graph for an illuminance at which said display displays at its maximum luminance without changing the corresponding luminance on the graph and a second user input device for manually selectively varying a second point on the graph for a luminance to be said minimum luminance when said signal indicates a minimum illuminance, wherein said second user input device varies the second point without changing the corresponding illuminance on the graph.

2. The display system of claim 1, wherein said display controller causes said display to display at said maximum luminance when said signal indicates that the ambient illuminance is equal to or greater than the illuminance of the first point.

3. The display system of claim 1, wherein said display controller compares said ambient illuminance to said minimum illuminance.

4. The display system of claim 1, where said display displays at said minimum luminance when said signal indicates that the ambient illuminance is less than or equal to said minimum illuminance.

5. The display system of claim 1, wherein said luminance of said display is purely an automatic function of the ambient illuminance when said signal indicates that the ambient illuminance is between said minimum illuminance and said maximum illuminance.

6. The display system of claim 1, wherein said minimum illuminance is near a threshold of ambient illuminance detectable by said sensor.

7. The display system of claim 1, wherein said maximum luminance of said display is a physical limitation of said display.

8. A method for varying a luminance at which a display displays information between a maximum luminance and a minimum luminance, wherein each illuminance at which the display displays the information is representable on a graph as a function of a corresponding illuminance, and the luminance of the display varies with illuminance in accordance with the graph, said method comprising the steps of:

manually adjusting a first point on the graph for an illuminance at which the display displays information at the maximum luminance without changing the corresponding luminance on the graph;

manually varying a second point on the graph for a luminance corresponding to a minimum illuminance to be the minimum luminance, wherein the second point is varied without changing the corresponding illuminance on the graph;

detecting an ambient illuminance; and automatically varying the display to display at a luminance between the minimum luminance and the maximum luminance based upon said detected illuminance in accordance with the graph.

9. The method of claim 8, wherein the display displays at the maximum luminance when the ambient illuminance is equal to or greater than the illuminance of the first point.

10. The method of claim 8, where the display displays at the minimum luminance when the ambient illuminance is less than or equal to said minimum illuminance.

11. The method of claim 8, wherein the luminance of the display is purely an automatic function of the ambient illuminance when the ambient illuminance is between the minimum illuminance and the maximum illuminance.

12. The method of claim 8, wherein the minimum illuminance is near a threshold of detectable ambient illuminance.

* * * * *